(No Model.) 5 Sheets—Sheet 1.
J. M. JONES.
ORE OR FEED PULVERIZER.
No. 500,582. Patented July 4, 1893.
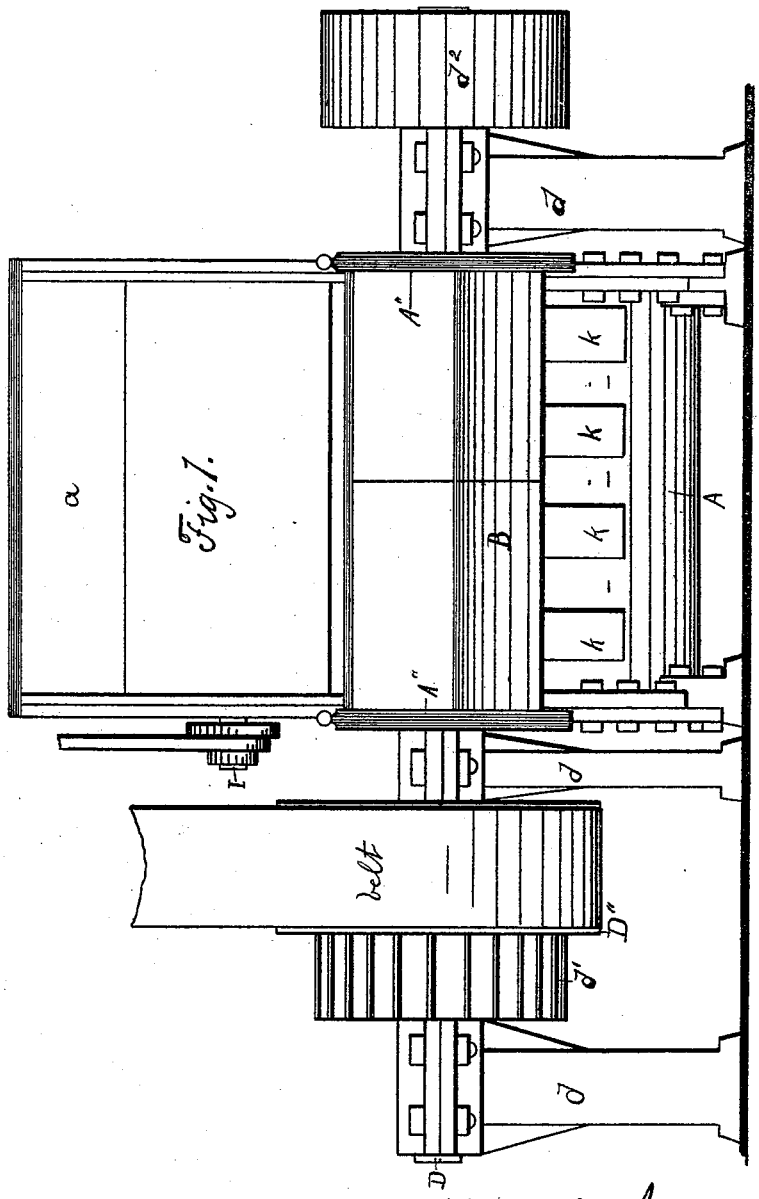
WITNESSES:
INVENTOR
John M Jones
BY
ATTORNEY.

(No Model.) 5 Sheets—Sheet 2.
J. M. JONES.
ORE OR FEED PULVERIZER.
No. 500,582. Patented July 4, 1893.
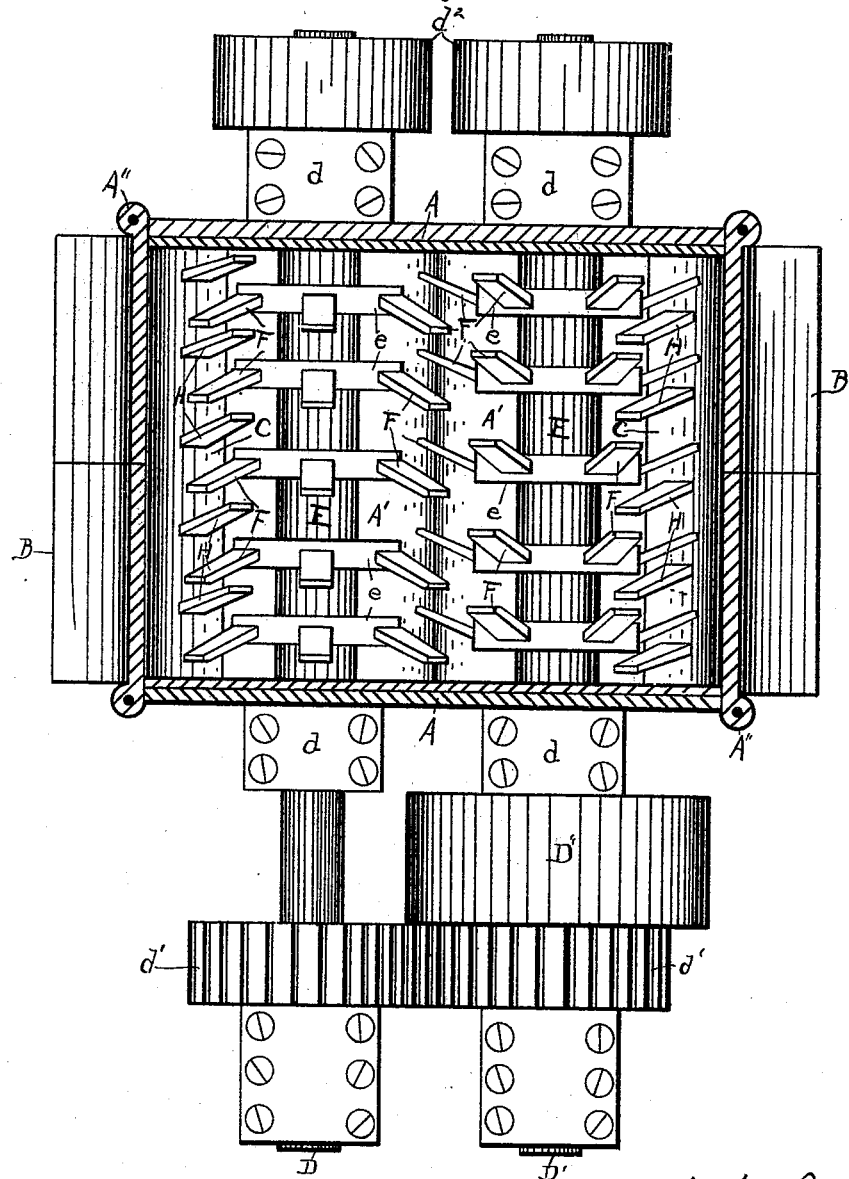

(No Model.)
J. M. JONES.
ORE OR FEED PULVERIZER.
No. 500,582. Patented July 4, 1893.
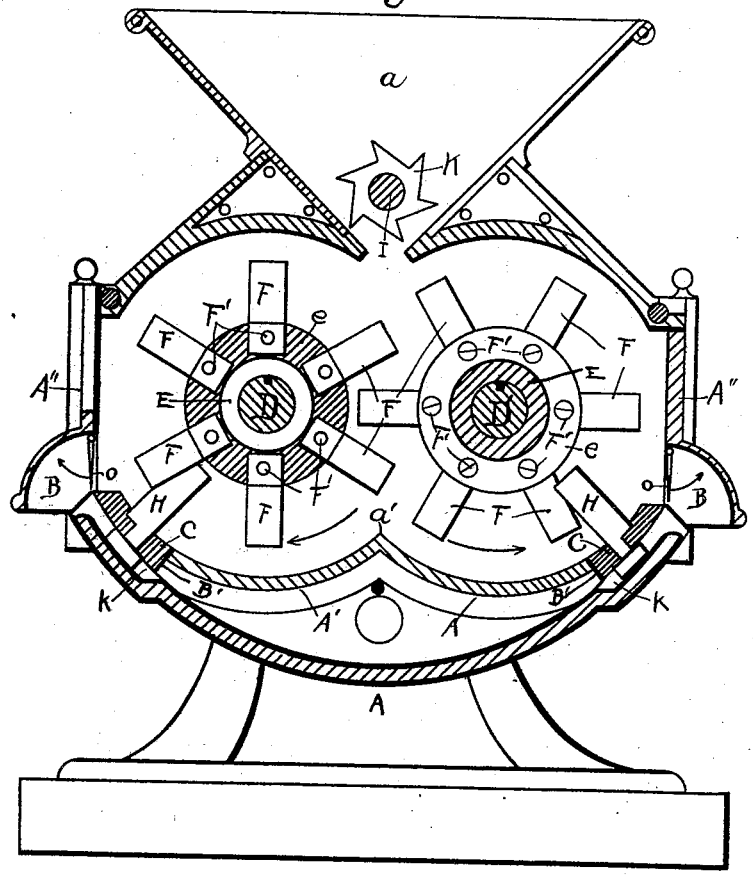
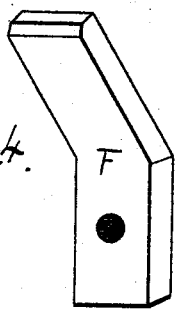
WITNESSES:
John M Jones
INVENTOR
BY
ATTORNEY.

(No Model.)  5 Sheets—Sheet 4.

J. M. JONES.
ORE OR FEED PULVERIZER.

No. 500,582. Patented July 4, 1893.

WITNESSES:
n J Schmit
F McGrath

INVENTOR
John M. Jones
BY
ATTORNEY.

(No Model.) 5 Sheets—Sheet 5.

J. M. JONES.
ORE OR FEED PULVERIZER.

No. 500,582. Patented July 4, 1893.

WITNESSES:
M. J. Schmitt
F. J. McGrath

INVENTOR
John M. Jones
BY
ATTORNEY.

UNITED STATES PATENT OFFICE.

JOHN M. JONES, OF OMAHA, NEBRASKA, ASSIGNOR OF ONE-HALF TO CHARLES L. WRIGHT AND GEORGE B. LASBURY, OF SAME PLACE.

ORE OR FEED PULVERIZER.

SPECIFICATION forming part of Letters Patent No. 500,582, dated July 4, 1893.

Application filed February 11, 1893. Serial No. 461,998. (No model.)

*To all whom it may concern:*

Be it known that I, JOHN M. JONES, of Omaha, in the county of Douglas and State of Nebraska, have invented certain useful Improvements in Ore and Feed Pulverizers; and I do hereby declare that the following is a full, clear, and exact description of the invention, such as will enable others skilled in the art to which it appertains to make and use the same, reference being had to the accompanying drawings, which form a part of this specification.

This invention has relation to a new and novel pulverizer.

The object of my invention is, to provide a pulverizing machine, that shall be simple of construction and readily operated, as will be described more fully hereinafter and finally pointed out in the claims.

Figure 5:
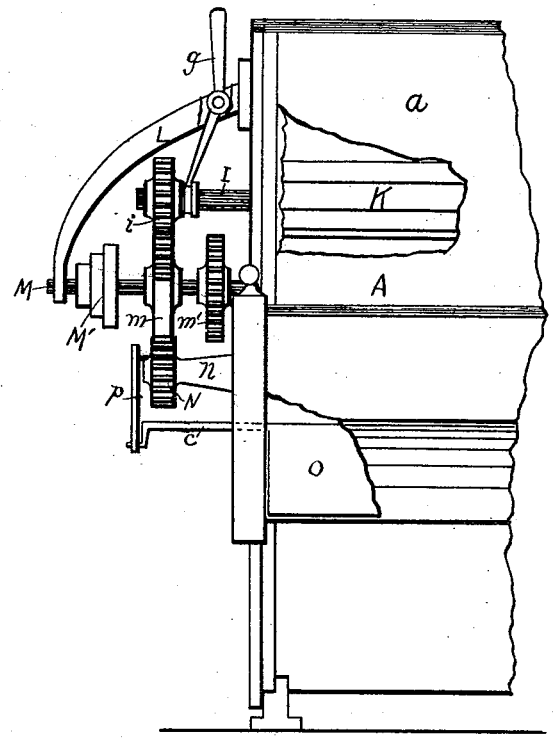
Figure 6:
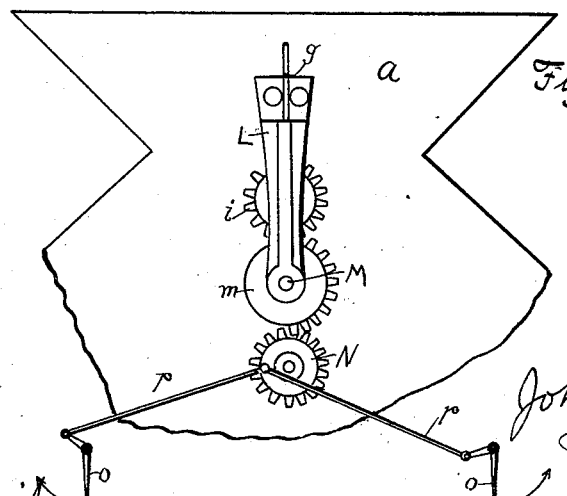
Figure 7:
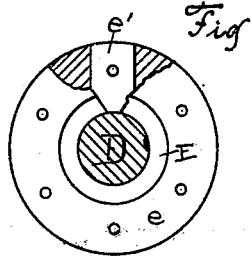
Figure 8:
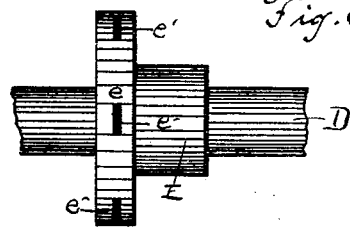
Figure 9:
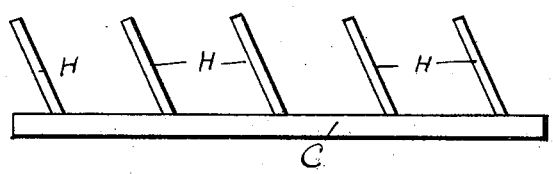
Figure 10:
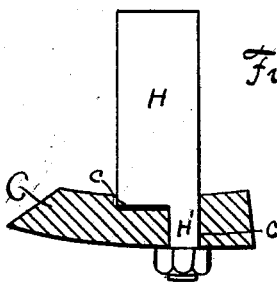

In the accompanying drawings Figure 1, shows a side elevation of a pulverizer embodying my invention. Fig. 2 is a top view with a portion removed. Fig. 3 shows a central vertical sectional view thereof. Fig. 4 shows a perspective of one of the interchanging teeth. Fig. 5 is a broken end view, showing the arrangement of the automatic feed; Fig. 6 a front view of Fig. 5. Figs. 7 and 8 show one of the tooth hubs; and Figs. 9 and 10 a side and end view respectively, of the interchanging tooth-rack, as employed in my invention.

A represents the casing or shell of my pulverizer of any suitable metal, having two partially cylindrical chambers, as shown in Fig. 3. This shell is suitably supported and is provided above with a hopper $a$, and upon each side with the exhaust or chute-opening B. The double concave bottom A', is provided with a suitable lining $a'$, and the recesses B', within which the interchangeable tooth-racks C are removably held. The side panels A" are hinged at each end so that they can be swung outward when the racks C are to be removed or exchanged.

Passing through the incasing shell, and centrally through each of the chambers, are the two shafts D, D', both being given support on the outside by means of the bearings $d$, $d$. At one end each of these shafts is provided with an intermeshing gear $d'$, $d'$, the shaft D' being further provided with the driving pulley D". At the remaining end are secured the balancing wheels $d^2$, $d^2$. Mounted upon the shafts D, D', are a suitable number of tooth hubs $e$, as shown in Figs. 7 and 8, of metal, and provided with a number of keyways $e'$, within which the interchangeable angle teeth F are removably secured. These teeth hubs are keyed upon the shafts and so securely held. The teeth F are secured by means of a screw or bolt F' passing through the flange E of the hub $e$, as shown in the drawings. The teeth F extend at an angle to a plane passing vertically and transversely through the shafts, the teeth of one shaft inclining toward one end, and those of the other shaft toward the other end of the shell, as clearly shown in Fig. 2. The hubs $e$ are positioned upon their respective shafts, opposite one another, but the teeth inclining in opposite directions readily pass one another, the path of the teeth passing near the flanges of the hubs of the opposite shaft, as will be understood by referring to Fig. 3.

The tooth racks C may be of wood or metal, and to work nicely within their seatings are concavo-convex, and provided with a series of transverse seatings $c$, and the openings $c'$ within and through which the lower portion of the body and the stem H', of the teeth H extend, the teeth being held by means of bolts. The number of teeth on these racks equal the number of hubs upon each shaft. To accommodate the protruding bolts of the teeth H, the incasing shell is provided with a suitable number of pockets $k$, as shown. There is a rack for each shaft, but the teeth of the rack and shaft incline in opposite directions, so that the revolving teeth pass very near those within the racks.

Within the hopper $a$ is mounted a shaft I, provided with the feeder K, centrally within and above the casing, and comprises an approximated star-shaped bar arranged to release either continuously or intermediately in feeding the material into the pulverizer; in Figs. 5 and 6 I have shown two detail views of a feed mechanism as employed in my device. The feeder is operated by a power independent of that operating the two hub shafts D, D, which latter run at a very high rate of speed. In Figs. 5 and 6, the feed shaft I, is provided with a sliding gear wheel $i$ operated by means of the lever $g$. This lever is pivoted to the bracket L, giving support to the driving stub shaft M, which works within a bearing at the side of the casing A. This shaft is provided with the speed pulley M', the mutilated gear $m$, and the gear $m'$. Below this shaft M, is mounted the gear N, upon a suitable stub shaft $n$. The gear N is adapted to mesh with the mutilated gear $m$. The gear $i$ sliding upon the shaft F, may be adjusted so as to mesh with either the mutilated gear $m$ or the gear $m'$, a ride dead between them, so that an intermittent feed may be obtained by means of the mutilated gear, or a continuous feed by means of the gear $m'$.

Positioned within each of the hood shaped exhausts B, is an ordinary hinged valve panel O, provided at one end with an extending crank rod in rod connection $p$, with the gear N, so that as the gear N which is intermittently actuated by the mutilated gear $m$, revolves, it actuates the valves O, both of said valves being connected to this pulley, as shown in Fig. 6. It is by means of the valve openings that the pulverizer is emptied. When it is desired to reduce the material to a powdered condition, the feed mechanism is stopped, and the valves "O" are closed, so that the material is continuously worked until properly reduced. However, ordinarily, the valves O, O are operated to intermittently permit the material to escape through these valve openings.

The operation of my device is very simple. The material to be comminuted is thrown into the hopper, and evenly fed into the pulverizing chamber, either intermittently or continuously, as desired. The intermeshing shafts D, D', have in the meantime been set in motion and are revolving at a very high rate of speed, in opposite directions. The material fed into the chamber encounters the revolving teeth F, and is violently thrown at an angle either toward one end of the chamber or the other, according to the direction of the revolving tooth encountered. In its flight into this new direction, the material comes into violent contact with such material as encountered the teeth of the opposite shaft, and by means of the impact of this colliding material are the particles reduced. Of course it is understood, that the teeth in their revolutions encounter and throw the particles against one another, time and again, until they are reduced to a powdered condition. Now when the teeth F become worn upon one side and edge, it is simply necessary to remove and reverse them, when they present a new surface, so that they can be used until worn to a ragged edge upon all sides. The rack teeth also possess this interchangeable feature, for when the teeth are worn upon one side, the rack is removed and placed within the seating of the other side.

If desired, the chute or exhaust openings may be left closed or opened, according to the toughness of the material to be pulverized, or if desired, the valves may be connected to the gear N, and so intermittently opened or closed. The device is simple in its construction and operation, and

Having thus described my said invention, what I claim as new, and desire to secure by United States Letters Patent, is—

1. In a pulverizer, the combination with an incasing shell, interiorly provided with two partially cylindrical chambers and a hopper, a hooded exhaust extending from each of said chambers, a valve panel within said exhaust adapted to be intermittently opened and closed, interchangeable tooth racks within said chambers, interchangeable teeth removably secured within said racks, extending at an angle to said racks, two connected operative shafts within said shell having intermeshing gears, and a system of teeth hubs upon said shafts, provided with extending angle teeth, all arranged substantially as and for the purpose set forth.

2. In a pulverizer, the combination with an incasing shell, interiorly provided with two partially cylindrical chambers and a hopper, a hooded exhaust extending from each of said chambers, a valve panel within said exhaust, interchangeable tooth racks within said chambers, interchangeable teeth secured within said racks, extending at an angle to said racks, and provided with a supporting stem, two connected operating shafts within said shell having intermeshing gears, flanged teeth hubs keyed upon said shafts, and having key ways, adapted to removably hold a series of interchangeable angle teeth, said teeth in revolving passing one another and between said rack teeth, all substantially as and for the purpose set forth.

3. In a pulverizer, the combination with an incasing shell, interiorly provided with two partially cylindrical chambers and a hopper, a hooded exhaust extending from each of said chambers, a valve panel within said exhaust adapted to be opened or closed, interchangeable tooth racks within said chambers, having concavo-convex body-portions and the seatings—and stem openings—, interchangeable teeth secured within said racks, extending at an angle to said racks, and provided with a supporting stem, two connected operating shafts within said shell having intermeshing gears, flanged teeth hubs keyed upon said shafts, and having drift ways, adapted to removably hold a series of interchangeable angle teeth, said teeth in revolving passing one another and between said rack teeth, an automatic feeder within said hopper, provided with the shaft I, the sliding gear $i$ upon said shaft, the stub power shaft M supported by means of the bracket L, and being provided with the speed pulley M', mutilated gear $m$, and gear $m'$, the gear N meshing with said gear $m$, and the rods $p$, connected to the valve panel—within the hoods B, so that said feeder and exhaust may be intermittently and alternately operated, all substantially as and for the purpose set forth.

In testimony whereof I affix my signature in presence of two witnesses.

JOHN M. JONES.

Witnesses:
  G. N. SUES,
  GEORGE B. LASBURY.